United States Patent [19]

Ribic

[11] Patent Number: 5,528,696

[45] Date of Patent: Jun. 18, 1996

[54] HEARING AID

[75] Inventor: Zlatan Ribic, Vienna, Austria

[73] Assignee: Viennatone Gesellschaft m.b.H., Vienna, Austria

[21] Appl. No.: 312,111

[22] Filed: Sep. 26, 1994

[30] Foreign Application Priority Data

Sep. 27, 1993 [AT] Austria ................................ 1943/93

[51] Int. Cl.⁶ .................................................. H04R 25/00
[52] U.S. Cl. ............................ 381/68.2; 381/94; 381/106
[58] Field of Search ............................ 381/68, 68.2, 68.4, 381/62, 94, 106; 84/706; 328/15

[56] References Cited

U.S. PATENT DOCUMENTS

| 4,461,025 | 7/1984 | Franklin | 381/94 |
| 4,495,643 | 1/1985 | Orban | 381/94 |
| 5,394,475 | 2/1995 | Ribic | 381/68.2 |

FOREIGN PATENT DOCUMENTS 0542710  5/1993  European Pat. Off. .
0542711  5/1993  European Pat. Off. .

*Primary Examiner*—Curtis Kuntz
*Assistant Examiner*—Huyen D. Le
*Attorney, Agent, or Firm*—Collard & Roe

[57] ABSTRACT

A hearing aid with a microphone, a preamplifier connected behind it which is connected to a signal processing voltage-controlled circuit which is provided with a voltage-controlled filter, for example, which is connected to the output amplifier controlling an earpiece. In order to achieve the best possible adaptation it is provided that the signal processing voltage-controlled circuit is connected to a signal analysing circuit (MAC) controlling it, which is in connection on the input side with the preamplifier or output amplifier (30, 50) and is substantially formed by a Hilbert circuit (HS), the two outputs (A, F) of which supplying the momentary values of the frequency and the amplitudes of the input signal are connected to the inputs of corresponding Hilbert circuits via high-pass filters and the outputs of all three Hilbert circuits are in connection with the control inputs of a voltage-controlled signal processing circuit (40).

4 Claims, 4 Drawing Sheets

HEARING AID

BACKGROUND OF THE INVENTION

The invention relates to a hearing aid in accordance with the preamble of claim 1.

In such known solutions a signal is derived from the input and/or output signal, which signal is usually representative of the average energy content of the signal over a time determined by respective time elements, and this signal is used for controlling a voltage-controlled filter and, mostly, also a voltage-controlled amplifier.

As is frequently experienced, such common hearing aids do not always lead to the desired success despite careful adaptation. This is to be observed in particular with persons with impaired hearing in the inner ear, which are encountered with rising frequency. The reason for this is mostly caused by the rectifier time constants of the signal rectifiers required for all possible automatic controls and for filters, amplifiers and the like. Common rectifiers usually emit the effective or mean value of the input signal averaged over several periods. The control voltages thus produced and the signal influences thus carried out therefore always trail the actual momentary input signal.

Such hearing aids work perfectly only in one point of the curves for frequency and loudness. In complex input signals such as language signals, for example, it is impossible in this manner to simulate the natural behaviour of the cochlea with respect to time and/or frequency domain, which, moreover, is impaired in inner-ear patients, i.e., it is not equivalent to an ear of usual hearing.

EP-A1-542 710 discloses a circuit for a delay-free signal processing, in which a combinatorial circuit is connected behind a Hilbert circuit which is provided with two all-passes and which supplies at its outputs two signals displaced in their phase relationship by 90°, which combinatorial circuit combines the said two signals in accordance with the algorithm $$A(t) = \sqrt{h_1^2(t) + h_2^2(t)}$$

and supplies the output signal of this circuit to a divider as dividend signal, with the divisor input of the divider being connected to an output of an all-pass of the Hilbert circuit.

In this way it is possible to amplify the spectral contrast and to achieve better adaptation possibilities as compared with other hearing aid circuits.

This, however, leads to the disadvantage that the original dynamics of the input signal are lost and that the output signal is provided with no or very low dynamic differences.

Furthermore, from EP-A1-542 711 a circuit has become known with which a frequency transposition is possible in real time.

In this known circuit a Hilbert circuit is also provided, the outputs of which are also connected to a combinatorial circuit which adds these signals according to their amounts or combines them in accordance with the algorithm $$A(t) = \sqrt{h_1^2(t) + h_2^2(t)}$$

The output of this combinatorial circuit then supplies a signal which corresponds to the momentary amplitude of the input signal, which is only the case in an approximative manner when the addition is made with respect to the amount.

Furthermore, differentiators are connected to the outputs of the Hilbert circuit, the outputs of which are connected to a second combinatorial circuit which add said differentiated signals with respect to their amounts or combine them in accordance with the algorithm as mentioned above. The output of said second combinatorial circuit is connected to the divisor input of a divider whose dividend input is connected to the output of the first combinatorial circuit. The output of the divider supplies a signal representative of the momentary frequency of the input signal, which in the case of an addition of the amounts of the output signals of the Hilbert circuit or its differentiated signals respectively is only the case in an approximative manner.

Owing to the analytic signal representative of the frequency of the intput signal it is possible to achieve a frequency transposition in which the audio intervals are retained substantially, but it is not possible with these signals to adapt sufficiently a hearing aid to the respective requirements of the patient. The reason for the insufficient possibilities of an adaptation are the response and decay times, the compression factors, the transmission characteristics and the like, which in common solutions cannot be changed depending on the input signals.

SUMMARY OF THE INVENTION

It is the object of the present invention to avoid these disadvantages and to propose a hearing aid of the kind mentioned above which can be adapted optimally to the respective requirements.

This is achieved in accordance with the invention by the characterizing features of claim 1.

Owing to the two high passes the carrier frequency or the amplitude of the carrier wave is suppressed, so that an amplitude modulation signal and a frequency modulation signal are supplied to the inputs of the second and third combinatorial circuit, from which in the analytic circuits there are generated a signal AAM representative of the momentary amplitude of the amplitude change of the input signal, a signal FAM representative of the momentary frequency of the amplitude change of the input signal, a signal AFM representative of the momentary amplitude of the frequency change of the input signal and a signal FFM representative of the momentary frequency of the frequency change of the input signal. In this way six signals obtained from the input signals are available for controlling the voltage-controlled filter, which signals allow an optimal signal-dependent processing of the input signal.

The features of claim 2 provide the possibility of being able to adapt the signal processing to a very large extent to the cochlear conditions of the user.

The features of claims 3 and 4 provide the possibility to reconstruct lost hearing faculties to a very large extent, whereby middle-ear parameters can be taken into account.

BRIEF DESCRIPTION OF THE DRAWINGS

The invention shall now be outlined by reference to the enclosed drawings, in which.

DETAILED DESCRIPTION OF PREFERRED EMBODIMENTS

Figure 1:
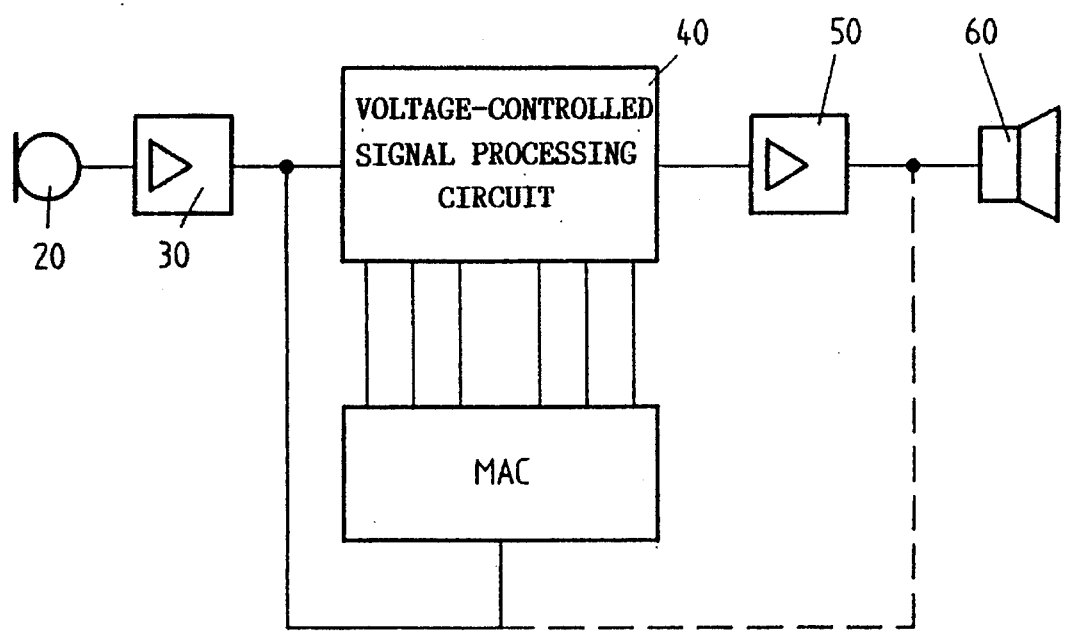
FIG. 1 schematically shows a hearing aid in accordance with the invention.

FIG. 1 shows schematically a hearing aid in accordance with the invention. Microphone 20 is connected to a preamplifier 30 which is connected on the output side with a voltage-controlled signal processing circuit 40 which is connected before an output amplifier 50 which controls earpiece 60.

Figure 2:
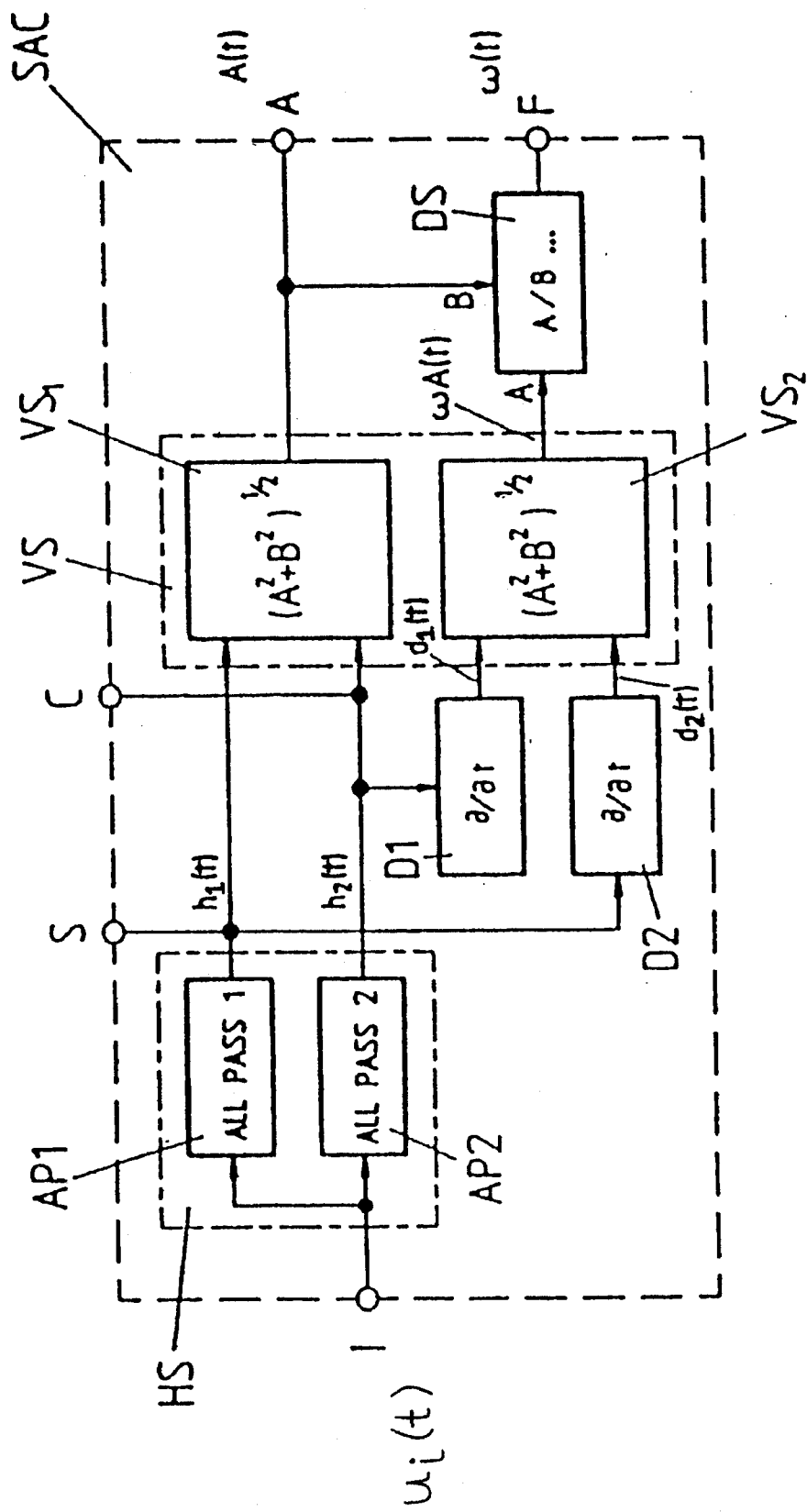
FIG. 2 shows a signal-analysing circuit.

The signal processing circuit 40 is controlled by a signal analysing circuit MAC which is connected on the input side with the output of the preamplifier 20. As is indicated by the broken line, the analytic circuit MAC may also be connected to the output amplifier 50. FIG. 2 shows an analytic circuit SAC, as is used for an analytic circuit MAC provided in a hearing aid in accordance with the invention, said analytic circuit SAC being provided with a Hilbert circuit HS.

In the Hilbert circuit HS two Hilbert signals $h_1(t)$ and $h_2(t)$ are produced, which are provided with the same energy spectrum as the input signal $u_i(t)$, representative of the relationship $$u_i(t) = A \cdot \sin(\omega \cdot t + \phi),$$

whereby, however, the Hilbert signals $h_1(t)$ and $h_2(t)$ are displaced with respect to one another by $\pi/2$.

The signal $h_1(t)$ corresponds to the relationship:

$$h_1(t) = A \cdot \sin(\omega \cdot t + \beta),$$

and signal $h_2(t)$ corresponds to the relationship:

$$h_2(t) = A \cdot \cos(\omega \cdot t + \beta),$$

whereby A means the amplitude, $\omega$ the angular frequency, t the time, $\phi$ the phase angle and $\beta$ the new phase caused by the all-pass.

Furthermore, two differentiators $D_1$ and $D_2$ are provided which are connected to the outputs of the Hilbert circuit HS. A first combinatorial circuit $VS_1$ is connected with its two inputs to the outputs of the Hilbert circuit HS and produces an output signal A(t) according to the following algorithm when signals $h_1(t)$ and $h_2(t)$ are supplied to the inputs:

$$A(t) = \sqrt{h_1^2(t) + h_2^2(t)} \rightarrow$$

$$A \cdot \sqrt{\sin^2(\omega t + \beta) + \cos^2(\omega t + \beta)} = A$$

A second combinatorial circuit $VS_2$ is connected with its two inputs to the differentiators $D_1$ and $D_2$ and produces an output signal $\omega A(t)$ according to the following algorithm for signals $d_1(t)$ and $d_2(t)$ supplied to the inputs:

$$\omega A(t) = \sqrt{d_1^2(t) + d_2^2(t)}$$

A divider DS is connected with its inputs to the combinatorial circuits $VS_1$ and $VS_2$ and produces an output signal $\omega(t)$ according to the following formula:

$$\omega(t) = \omega A(t)/A(t)$$

Therefore, at the output F of divider DS there is available an output signal representative of the momentary frequency of the input signal $u_i(t)$ supplied to input I. Moreover, a signal A(t) representative of the momentary amplitude of the input signal $u_i(t)$ is obtained via output A which is connected to the output of the combinatorial circuit VS.

The sine and cosine signal obtained from the input signal $u_i(t)$ can be tapped from the outputs S and C of the analytic circuit SAC which are connected to the two all-passes AP1 and AP2 forming the Hilbert circuit HS.

Figure 3:
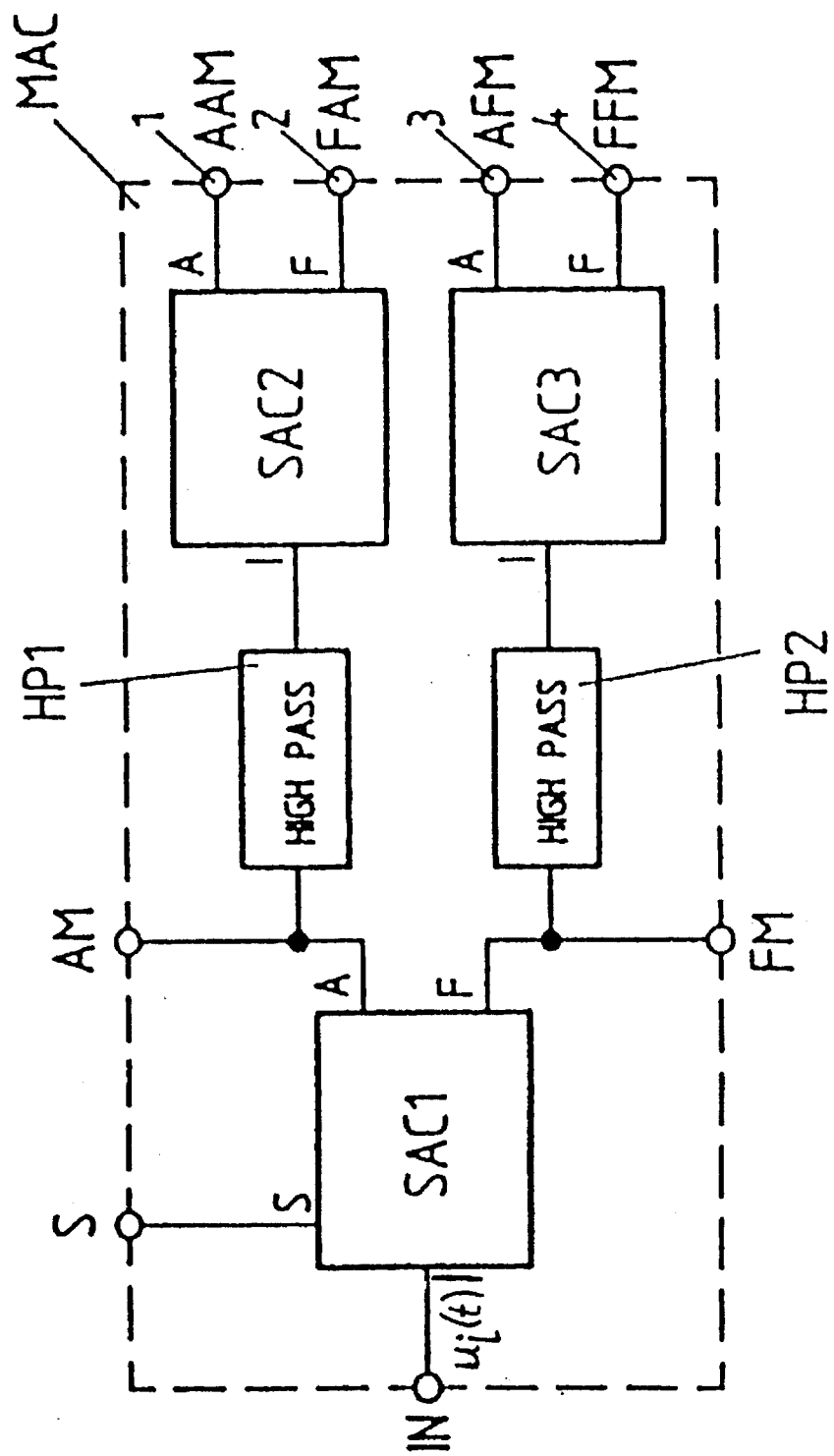
FIG. 3 shows a circuit processing modulation signals.

The signal analysing circuit MAC shown in FIG. 3 is provided with a first analysing circuit SAC1, to whose input I there is supplied the input signal $u_i(t)$, which is an amplitude- and frequency-modulated signal such as a voice signal, for example, and whose sine output is connected to the output S and whose outputs A and F are connected to the outputs AM and FM, respectively, of the circuit MAC. Moreover, these outputs are connected via high-pass filters HP1 and HP2 to the inputs of a second and third analytic circuit SAC2 and SAC3.

The high-pass filters HP1 and HP2 suppress the carrier frequency or the amplitude of the carrier wave, so that an amplitude modulation signal is supplied to input I of the second analytic circuit SAC2 and a frequency modulation signal is supplied to input I of the third analytic circuit SAC3.

The outputs A and F of the second analytic circuit SAC2 are connected to the outputs 1 and 2 of the circuit MAC, from which a signal AAM representative of the momentary amplitude of the amplitude change of the input signal and a signal FAM representative of the momentary frequency of the amplitude change of the input signal can be tapped.

The outputs A and F of the third analytic circuit SAC3 are connected to the outputs 3 and 4 of the circuit MAC, from which a signal AFM representative of the momentary amplitude of the frequency change of the input signal and a signal FFM representative of the momentary frequency of the frequency change of the input signal can be tapped. Therefore, there are a total of six signals derived from the input signal for processing the input signal.

Figure 4:
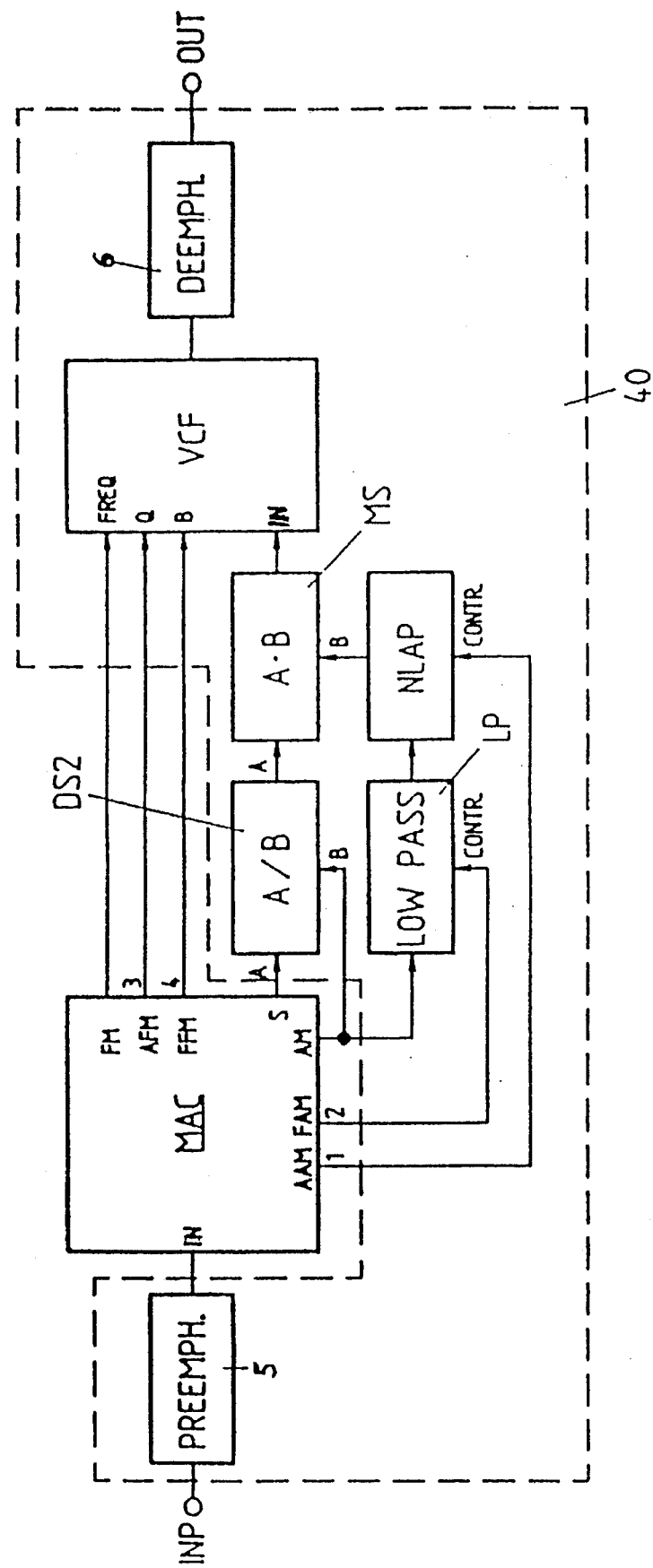

FIG. 4 shows a part of a hearing aid circuit, whereby the voltage-controlled signal processing circuit 40 and the signal analysing circuit MAC are each indicated in broken lines. A pre-distorter 5 is connected in front of the signal analysing circuit MAC. The outputs FM, 3 and 4 of the circuit MAC are connected to the inputs FREQ, Q and B of a voltage controlled filter VCF belonging To the voltage-controlled signal processing circuit 40. Instead of a voltage-controlled filter it could also be provided with a voltage-controlled amplifier or even both. The centre frequency VCF is set by the signal supplied to input FREQ and the slope of the filter curve and thus the filter quality are controlled by the signal supplied to input Q. The bandwidth of filter VCF is controlled by the signal supplied to its input B and the input signal to be filtered is supplied to input IN.

The output S of circuit MAC, from which a sine signal of the input signal can be tapped, is connected to the divisor input of a divider DS2, whose dividend input is connected to the output AM of circuit MAC, from which a signal representative of the amplitude of the input signal can be tapped.

The output AM is further connected to an input of a controllable low-pass filter LP, whose control input is connected to the output 2 of the circuit MAC, from which the signal FAM can be tapped. The output of the controllable low-pass filter LP is connected to the input of a non-linear amplitude regeneration circuit NLAP whose control input is connected to the output 1 of the circuit MAC, from which the signal AAM can be tapped.

The output of the amplitude regeneration circuit NLAP and the output of divider DS2 are connected to the inputs of a multiplier MS whose output is connected to the input IN of the voltage-controlled filter which is provided on the output side with an equalizer 6.

Figure 5:
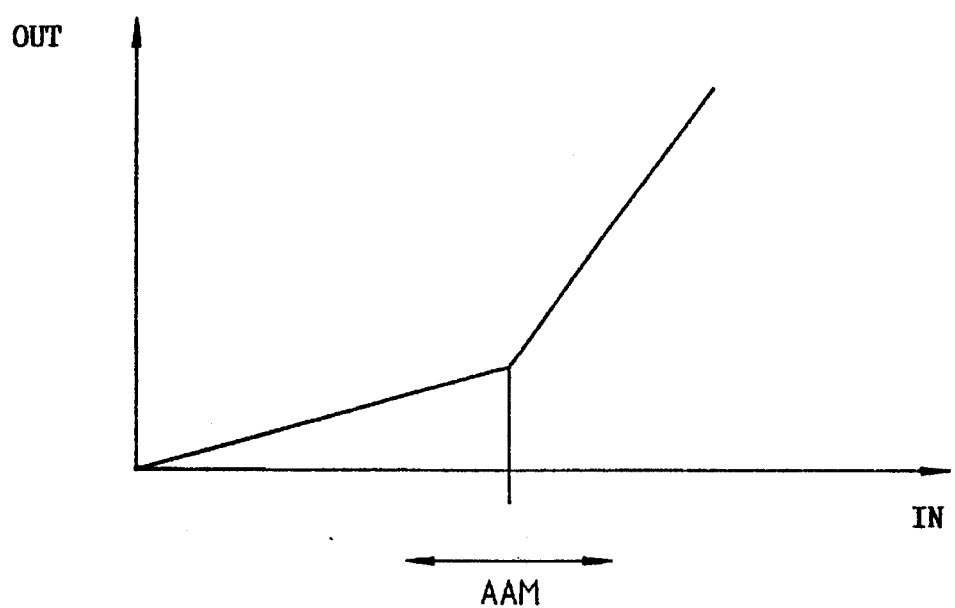
FIG. 4 shows a circuit in accordance with the invention for processing an input signal and FIG. 5 shows the characteristics of a non-linear amplitude regeneration circuit.

Owing to the division of the sine signal of the input signal by the signal AM representative of the momentary amplitude of the input signal the dynamics of the signal is lost, but the spectral contrast is amplified, as the signal AM representative of the momentary amplitude of the input signal is processed depending on the signal AAM representative of the momentary amplitude of the amplitude change of the input signal and said signal is further processed in the non-linear amplitude regeneration circuit NLAP. The regeneration circuit NLAP, as can be seen in FIG. 5, is provided with characteristics with two substantially linear segments with different slopes, whereby the salient point of this curve can be changed by the signal AAM of the analytic circuit MAC representative of the momentary amplitude of the amplitude change of the input signal. The signal obtained at the output of the regeneration circuit NLAP is multiplied with the spectral-contrast-amplified output signal of the divider DS2, so that the dynamics, depending on the signal and the desired compression factor, is present again. This is caused by the circumstance that the regeneration circuit NLAP reduces the continuously present share of the signal supplied to its input and thus the modulation share of the output signals with respect to the continuously present share increases in the output signal of the regeneration circuit NLAP, thus resulting in increased dynamics.

The voltage-controlled filter VCF is substantially a band equalizer which amplifies certain frequency ranges more or less in a selective manner, with the centre frequency being controlled by the signal FM representative of the momentary frequency of the input signal of the analytic circuit MAC. The bandwidth and filter quality (preemphasis) are controlled by the signal FFM representative of the momentary frequency of the frequency change of the onput signal and the signal AFM representative of the momentary amplitude of the frequency change of the input signal.

These measures ensure that the dynamics of the output signal remains within controllable limits and the important amplitude differences of the input signal are also maintained. It may be provided in this respect that the filter properties are only adjustable in ranges which are important for understanding speech.

The proposed circuit can be used for improved understandability of speech by amplifying spectral contrast, controlling the dynamics in the desired manner and adapting the filter properties to the signal.

I claim:

1. A hearing aid with a microphone, a preamplifier connected thereafter which is connected to a signal processing voltage-controlled circuit which is provided with a voltage-controlled filter, said voltage-controlled circuit is connected to an output amplifier which controls an earpiece, characterized in that the signal processing voltage-controlled circuit is connected to a signal analyzing circuit (MAC) which controls it and which is in connection with the preamplifier or output amplifier (30, 50) on the input side and is provided with a first analytic circuit (SAC1) provided with a Hilbert circuit (HS) for producing two signals (AM, FM) corresponding substantially to the momentary amplitude value and the momentary frequency value of an input signal whose output (A) supplying a signal (AM) representative of the momentary amplitude of the input signal which is connected via a high-pass filter (HP1) to a corresponding second analytic circuit (SAC2) whose two outputs supply a signal (AAM) representative of the momentary amplitude of the amplitude change of the input signal and a signal (FAM) representative of the momentary frequency of the amplitude change of the input signal and the output (F) of the first analytic circuit (SAC1) supplying a signal (FM) representative of the momentary frequency of the input signal which is connected via a further high-pass filter (HP2) to a third corresponding analytic circuit (SAC3) whose two outputs supply a signal (AFM) representative of the momentary amplitude of the frequency change of the input signal and a signal (FFM) representative of the momentary frequency of the frequency change of the input signal, with the outputs (A, F, 1, 2, 3, 4) of all three analytic circuits (SAC1, SAC2, SAC3) being in connection with the voltage-controlled signal processing circuit (VCF).

2. A hearing aid as claimed in claim 1, characterized in that an output of the Hilbert circuit (HS) of the analytic circuit (SAC1) is connected to the voltage-controlled filter <VCF) via a divider (DS2) and a multiplier (MS) connected behind it, whereby the divisor input of the divider (DS2) is connected to the output (A) of the first analytic circuit (SAC1) supplying the signal (AM) representative of the momentary amplitude of the input signal, which is further connected to a controlled low-pass filter (LP) whose control input is connected to the output of the second analytic circuit (SAC2) supplying the signal (FAM), representative of the momentary frequency of the amplitude change of the input signal whereby the output of the controlled low-pass filter (LP) is connected to the input of a controlled amplitude regeneration circuit (NLAP) whose control input is connected to the output of the second analytic circuit (SAC2) supplying a signal (AFM) representative of the momentary amplitude of the amplitude change and the output of the amplitude regeneration circuit (NLAP) is connected to the multiplier input of the multiplier (MS).

3. A hearing aid as claimed in claim 1, characterized in that the output supplying the signal (FM) representative of the momentary frequency of the input signal and the outputs of the three analytic circuits (SAC1, SAC2, SAC3 ) supplying the signals (AFM) representative of the momentary amplitude of the frequency change of the input signal and (FFM) representative of the momentary frequency of the frequency change of the input signal are directly connected to the voltage-controlled filter (VCF).

4. A hearing aid as claimed in claim 1, characterized in that a pre-distorter (5) is connected in front of the analyzing circuit (MAC) and an equalizer (6) is connected behind said analyzing circuit.

\* \* \* \* \*